US011936286B2

(12) United States Patent
Young

(10) Patent No.: US 11,936,286 B2
(45) Date of Patent: Mar. 19, 2024

(54) SYSTEMS AND METHODS FOR POWER GENERATION CONTROL

(71) Applicant: Hamilton Sundstrand Corporation, Charlotte, NC (US)

(72) Inventor: Shawn J. Young, Sycamore, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/741,389

(22) Filed: May 10, 2022

(65) Prior Publication Data

US 2023/0369966 A1 Nov. 16, 2023

(51) Int. Cl.
| | | |
|---|---|---|
| H02M 7/06 | (2006.01) |
| H02M 1/00 | (2006.01) |
| H02M 1/32 | (2007.01) |
| H02M 7/10 | (2006.01) |
| H02P 9/08 | (2006.01) |
| H02P 9/30 | (2006.01) |
| H02P 9/48 | (2006.01) |
| H02P 21/32 | (2016.01) |

(52) U.S. Cl.
CPC ......... *H02M 1/325* (2021.05); *H02M 1/0077* (2021.05); *H02M 7/10* (2013.01)

(58) Field of Classification Search
CPC .. H02M 7/06; H02P 21/32; H02P 9/08; H02P 9/302; H02P 9/48; H02P 2101/30; H02P 2103/20; F05D 2220/764; F05D 2260/85
USPC .......................................................... 307/82
See application file for complete search history.

(56) References Cited

U.S. PATENT DOCUMENTS

| | | | |
|---|---|---|---|
| 7,122,994 B2 * | 10/2006 | Anghel | F02N 11/04 |
| | | | 363/54 |
| 8,912,765 B2 | 12/2014 | Rozman et al. | |
| 9,548,691 B1 | 1/2017 | Rozman et al. | |
| 10,589,635 B1 | 3/2020 | Solodovnik et al. | |
| 10,778,127 B2 | 9/2020 | Rozman et al. | |
| 2011/0050184 A1 * | 3/2011 | Said | H02P 9/009 |
| | | | 322/95 |
| 2012/0182648 A1 | 7/2012 | Maddali et al. | |
| 2012/0194948 A1 | 8/2012 | Patel | |
| 2013/0016546 A1 | 1/2013 | Mountain | |

(Continued)

FOREIGN PATENT DOCUMENTS

CN 107499318 A 12/2017

OTHER PUBLICATIONS

Extended European Search Report, of the European Patent Office, dated Sep. 9, 2023, in corresponding European Patent Application No. 23172601.9.

*Primary Examiner* — Rexford N Barnie
*Assistant Examiner* — Xuan Ly
(74) *Attorney, Agent, or Firm* — Locke Lord LLP; Gabrielle L. Gelozin; Joshua L. Jones

(57) ABSTRACT

In accordance with at least one aspect of this disclosure, a system includes a generator controller configured to receive input from an AC power source, an exciter, and a generator, and output one or more signals to an exciter to control generation of generator output. The system also includes a rectifier controller configured to receive input from the generator controller, the exciter, and a rectifier, and output one or more control signals to the generator controller and the rectifier to control active rectification of the generator output.

19 Claims, 1 Drawing Sheet

(56) References Cited

U.S. PATENT DOCUMENTS

2014/0168825 A1  6/2014 Patel
2018/0034395 A1* 2/2018 Huang .................... H02P 9/302

* cited by examiner

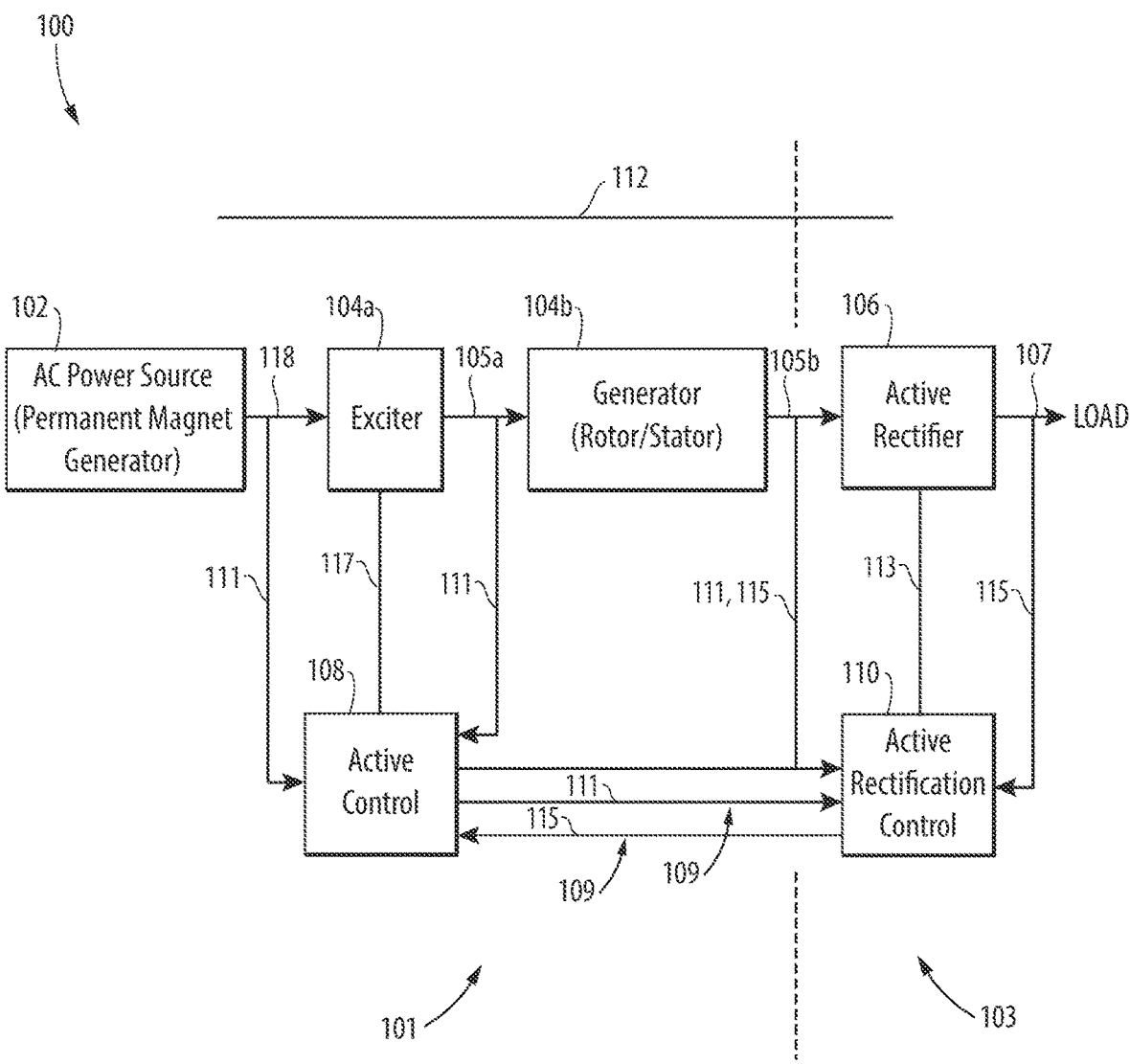

SYSTEMS AND METHODS FOR POWER GENERATION CONTROL

TECHNICAL FIELD

The present disclosure relates to power generation, and more particularly to systems and methods for controlling power generation.

BACKGROUND

In electrical systems, direct current (DC) power generation is a two stage process, including generating and controlling alternating current (AC) power and rectifying the AC power to DC power. Typically, there is a separate control function for each stage. Because of this, there can be inherent control delay if a fault event on the input of the first stage or the output of the second stage, before correction can take place elsewhere in the system.

There remains a need in the art for improvements to power generation control systems and methods, e.g., in the aerospace industry, which can mitigate or eliminate the control delay. This disclosure provides a solution for this need.

SUMMARY

In accordance with at least one aspect of this disclosure, a system includes a generator controller configured to receive input from an AC power source, an exciter, and a generator, and output one or more signals to an exciter to control generation of generator output. The system also includes a rectifier controller configured to receive input from the generator controller, the exciter, and a rectifier, and output one or more control signals to the generator controller and the rectifier to control active rectification of the generator output. In embodiments, the AC power source can include a permanent magnet generator.

In embodiments, the generator controller and the rectifier controller can be operatively connected to one another for direct communication between the generator controller and the rectifier controller. The generator and the exciter can be operatively connected to the generator controller configured to produce a direct current output to the generator, and the generator can be configured to produce an alternating current output. The rectifier can be operatively connected to the rectifier controller configured to receive the alternating current output from the generator and rectify the alternating current to a direct current output to be used by a load.

In embodiments, the rectifier controller can be configured to receive feedback from the output of the exciter, the output of the generator, and the output of the rectifier to determine if a fault event has occurred in any of the AC power source, the exciter, the generator, or the rectifier and send one or more fault feedback signals to the generator controller. In embodiments, the generator controller can be configured to control the exciter to modulate generation of excitation current based at least in part on the feedback fault signal from the rectifier controller. Further, the generator controller can be configured to receive feedback from the output of the AC power source, the output of exciter, and the output of the generator to determine if a fault event has occurred in any of the AC power source, the exciter, or the generator and send one or more fault feedback signals to the rectifier controller. In embodiments, the rectifier controller is configured to control the rectifier to modulate rectification of the output of the generator based at least in part on the feedback fault signal from the generator controller.

In accordance with at least one aspect of this disclosure, a system for controlling power generation can include a first stage configured to produce a first power output, having a first stage controller and a second stage configured to receive and alter the first power output and output a second power output different from the first power output, the second stage having a second stage controller.

In embodiments, the first stage controller and the second stage controller can be operatively connected for direct communication. The direct communication from one controller to the other can be configured to modulate one or more of the first power output or the second power output based on the communication between the first stage controller and the second stage controller.

In embodiments, the first stage controller can be configured to determine if a fault event has occurred in the first stage and communicate a fault signal to the second stage controller and the second stage controller can be configured to modulate the second power output based on the fault signal from the first stage controller. The second stage controller can be configured to control one or more second stage power generation elements operatively connected to the second stage controller based on the fault signal.

In embodiments, the second stage controller can be configured to determine if a fault event has occurred in one or more of the first stage and/or the second stage and communicate a fault signal to the first stage controller, and the first and/or second stage controller can be configured to modulate one or more of the first power output and/or the second power output based on the fault signal from the second stage controller. The first stage controller and/or the second stage controller can be configured to control one or more first and/or second stage power generation elements operatively connected to a respective first or second stage controller based on the fault signal. In embodiments, the first stage includes an alternating current stage and the second stage includes a direct current stage.

In accordance with at least one aspect of this disclosure, a method can include generating (e.g., with an AC power source) an alternating current, passively rectifying (e.g., with an exciter) the alternating current to a direct current, generating (e.g., with a generator) an alternating current, and actively rectifying (e.g., with a rectifier) the alternating current to a direct current to be used by a load. The method can further include determining if a fault event has occurred in an AC power generation stage of a DC power generation system, and if a fault event has occurred in the AC power generation stage, the method can include, communicating a fault signal between an AC power generation stage controller and a rectification stage controller and actively controlling an output of a rectification stage of the DC power generation system based on the fault signal.

The method can include, determining if a fault event has occurred in the rectification stage of the DC power generation system, and if a fault event has occurred in the rectification stage, the method can include communicating a fault signal between the rectification stage controller and the AC power generation stage controller and actively controlling an output of the rectification stage of the DC power generation system based on the fault signal.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic block diagram in accordance with this disclosure, showing a control scheme of a power generation system.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

In accordance with at least one aspect of this disclosure, a system 100 for controlling power generation can include a first stage 101 and a second stage 103. The first stage 101 is the AC generation stage that can include an AC power source 102 (e.g., a permanent magnet generator), an exciter 104a, and a generator 104b (e.g., a rotor and stator assembly). The second stage 103 can include an active rectifier 106. The first stage 101 can be configured to produce a first power output 105b, controlled by a first controller 108 (e.g., a generator controller 108). The second stage 103 can be configured to receive the first power output 105b and alter the first power output 105b to produce a second power output 107 different from the first power output 105b. The second stage 103 can be controlled by a second controller 110 (e.g., a rectifier controller 110). Accordingly, the first stage 101 can include an alternating current stage 101 and the second stage 103 can include a direct current stage 103, where the first stage 101 generates and outputs an alternating current 105b, and the second stage 103 receives the alternating current 105b, rectifies the alternating current to output a direct current 107.

As shown, the first stage controller 108 and the second stage controller 110 can be operatively connected to one another for direct communication therebetween, for example as shown with lines 109. The direct communication from one controller to the other can be configured to modulate one or more of the first power output 105b or the second power output 107 based on the communication between the first stage controller 108 and the second stage controller 110, which will be described more specifically herein below.

In embodiments, the first stage controller 108 can be configured to determine if a fault event (e.g., a short or the like) has occurred in the first stage 101, and if a fault has occurred, the first controller 108 can be configured to communicate a fault signal 111 to the second stage controller 110. Upon receipt of the fault signal 111, the second stage controller 110 can be configured to modulate the second power output 107 (e.g., via line 113) based on the fault signal 111 from the first stage controller 108. More specifically, the second stage controller 110 can be configured to control one or more second stage power generation elements operatively connected to the second stage controller 110 (e.g., rectifier 106) based on the fault signal 111. For example, if a fault occurs upstream of the rectifier 106 (e.g., at the AC power source 102, the exciter 104a, or the generator 104b), the first controller communicates 108 the fault 111 directly to the second controller 110 over line 109 so that the second controller 110 can command the rectifier 106 (e.g., over line 113) to output less power to protect downstream components of the system 100 or the load.

Similarly, the second stage controller 110 can be configured to determine if a fault event has occurred in one or more of the first stage 101 and/or the second stage 103 (e.g., at the generator 104b and/or the rectifier 106) and communicate a fault signal 115 to the first stage controller 108. Upon receipt of the fault signal 115 (or upon detection if in the second stage 103), the first and/or second stage controller 108, 110 can be configured to modulate (e.g., over lines 117, 113) one or more of the first power output 105b and/or the second power output 107 based on the fault signal 115 from the second stage controller 110. More specifically, the first stage controller 108 and/or the second stage controller 110 can be configured to control one or more first and/or second stage power generation elements (e.g., any one or all of exciter 104a, generator 104b, or rectifier 106 as needed) based on the fault signal 115.

For example, if a fault occurs upstream of the rectifier 106 (e.g., at the exciter 104b) or at the rectifier 106, the second controller 110 can recognizes the fault internally and can command the rectifier 106 to scale back rectification to protect downstream components of the system 110. If the fault is in the second stage 103, at the rectifier 106, the second controller 110 can recognize the fault and communicate the fault signal 115 to the first controller 108, where the first controller 108 can command the exciter 104a (e.g., over line 117) to output less power to protect downstream components of the system 100.

In embodiments, the generator controller 108 and the rectifier controller 110 can act in concert. For example, while the rectifier controller 110 is controlling the rectifier 106, the rectifier controller 110 can also send the fault signal 115 to the generator controller 108 to command the exciter 104a to produce less power. Similarly, while the generator controller 108 is controlling the exciter 104a, the generator controller 108 can also send the fault signal 111 to the rectifier controller 110 to command the rectifier 106 to produce less power. Accordingly, upon detection of a fault, the direct communication between the generator controller 108 and rectifier controller 106 allows for active control the respective stage components, regardless of whether they are the site of the fault, upstream, or downstream of the site of the fault.

As shown, and as discussed above, the system 100 (e.g., a generator system) can include a AC power source 102 (e.g., a permanent magnet generator), an exciter 104a, a generator 104b, and an active rectifier 106 configured to provide power to a load. The system can also include a generator controller 108 and an active rectification controller 110.

The generator controller 108 can be operatively connected to receive input 111 from the AC power source 102, the exciter 104a, and the generator 104b. The generator controller 108 can also be operatively connected to output one or more signals 117 to the exciter 104a to control generation of excitation current 105a which ultimately controls the generator output (e.g., alternating current output 105b). The rectifier controller 110 can be operatively connected to receive input 111, 115 from any one or all of the generator controller 108, the exciter 104a, the generator 104b, and/or the rectifier 106. The rectifier controller 110 can also be operatively connected to output one or more control signals 113, 115 to the generator controller 108 and the rectifier 106 to control active rectification of the AC current 105*b* based on the input received by the rectifier controller 110.

The AC power source 102 can be operatively connected to the generator controller 108 configured to produce an alternating current output 118 to the exciter 104*a*. The exciter 104*a* can be operatively connected to the generator controller 108 configured to produce a direct current output 105*a* to the generator 104*b*. The rectifier 106 can be operatively connected to the rectifier controller 110 configured to receive the alternating current output 105*b* from the generator 104*b* and rectify the alternating current 105*b* to a direct current output 107 to be used by the load.

The rectifier controller 110 can be configured to receive feedback 111, 115 from the output of the exciter 104*a*, the output of the generator 104*b*, and the output of the rectifier 106 to determine if a fault event has occurred in any of the AC power source 102, the exciter 104*a*, the generator 104*b*, or the rectifier 106. If a fault is detected, the rectifier controller 110 can send one or more fault feedback signals 115 to the generator controller 108. Upon receipt of the fault feedback signals 115, the generator controller 108 can be configured to control the exciter 104*a* to modulate generation of excitation current based at least in part on the feedback fault signal 115, for example by decreasing an amount of power produced.

Additionally, the generator controller 108 can be configured to receive feedback 111 from the output of the AC power source 102, the output of the exciter 104*a* and the output of generator 104*b* to determine if a fault event has occurred in any of the AC power source, exciter 104*a*, or the generator 104*b*. If a fault is detected, the generator controller 108 can be configured to send one or more fault feedback signals 111 to the rectifier controller 110. Upon receipt of the fault feedback signals 111, the rectifier controller 110 can be configured to control the rectifier 106 to modulate rectification of the output 105*b* of the generator 104*b* based at least in part on the feedback fault signal 111, for example by scaling back rectification. The direct communication between the generator controller 108 and the rectifier controller 110 can therefore measure disturbance within their respective stages 101, 103, communicate the disturbance accordingly, and take corrective action before the disturbances upset the generation or rectification stages, further protecting the electronics.

In accordance with at least one aspect of this disclosure, a method can include generating an alternating current (from an AC power source 102), passively rectifying the alternating current to a direct current (e.g., with exciter 104*a*), generating an alternating current (e.g., first power output 105 from generator 104*b*), and actively rectifying the alternating current to a direct current (e.g., second power output 107 from rectifier 106).

The method can further include, determining if a fault event has occurred in an AC power generation stage (e.g., first stage 101) of a DC power generation system (e.g., system 100). If a fault event has occurred in the AC power generation stage, the method can include, communicating a fault signal between an AC power generation stage controller (e.g., generator controller 108) and a rectification stage controller (e.g., rectifier controller 110) and actively controlling an output of one or more of the AC power generation stage or a rectification stage of the DC power generation system based on the fault signal.

The method can further include, determining if a fault event has occurred in the rectification stage of the DC power generation system. If a fault event has occurred in the rectification stage, the method can include communicating a fault signal between the rectification stage controller and the AC power generation stage controller and actively controlling an output of the AC power generation stage of the DC power generation system based on the fault signal.

It should be understood that while certain components are shown connected to one another using solid lines, and directional arrows, elements of the system 100 may connected in any suitable manner. For example, the connecting lines may represent communication lines, which may be hardwire or wireless communication or any suitable combination thereof, or may represented mechanical connection, for example a shaft 112 connecting the AC power source 102, the exciter 104*a*, the generator 104*b*, and the rectifier 106.

Embodiments include a combined two stage control system, for example having a first AC power generation stage and a second rectification stage. The system can include providing feedforward input from the AC power generation control to rectification control and providing feedback from AC power generation control to excitation control. Sharing of information between the two control loops allows for the system as a whole to compensate for fault events (e.g., shorts, transients, and the like) more quickly. The shared information can include any suitable information such as information regarding perceived voltages, perceived currents, AC power generation control state, and/or active rectification control state which may result in recognizable fault events, for example. The ability for the input (AC power generation) stage and output (rectification) stage to react in concert to events provides improved power quality and reduction of stress on downstream components, therefore reducing overall cost. Moreover, because the system is able to quickly react to faults, limiting damage (if any) or stress on the electronics, embodiments allow for less expensive electronics to be used in the controllers in the active rectifier. Further, by limiting the overall effects of the faults on the system by quickly reacting, allows embodiments to increase the overall power while maintaining an absolute cap on the maximum output.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "controller," or "system." A "circuit," "module," "controller," or "system" can include one or more portions of one or more separate physical hardware and/or software components that can together perform the disclosed function of the "circuit," "module," or "controller," or "system", or a "circuit," "module," "controller," or "system" can be a single self-contained unit (e.g., of hardware and/or software). Furthermore, aspects of this disclosure may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
a generator controller configured to receive input from an AC power source, an exciter, and a generator, and output one or more signals to an exciter to control generation of generator output; and
a rectifier controller configured to receive input from the generator controller, and a rectifier, and output one or more control signals to the generator controller and the rectifier to control active rectification of the generator output, wherein the rectifier controller is configured to control the rectifier to modulate rectification of the output of the generator based at least in part on a feedback fault signal from the generator controller.

2. The system of claim 1, wherein the generator controller and the rectifier controller are operatively connected to one another for direct communication between the generator controller and the rectifier controller.

3. The system of claim 1, further comprising the generator and the exciter, wherein the exciter is operatively connected to the generator controller configured to produce a direct current output to the generator.

4. The system of claim 3, wherein the generator is configured to produce an alternating current output, and further comprising, the rectifier operatively connected to the rectifier controller configured to receive the alternating current output from the generator and rectify the alternating current to a direct current output to be used by a load.

5. The system of claim 4, wherein the rectifier controller is configured to receive feedback from the output of the exciter, the output of the generator, and the output of the rectifier to determine if a fault event has occurred in any of the AC power source, the exciter, the generator, or the rectifier and send one or more fault feedback signals to the generator controller.

6. The system of claim 5, wherein the generator controller is configured to control the exciter to modulate generation of excitation current based at least in part on the feedback fault signal from the rectifier controller.

7. The system of claim 4, wherein the generator controller is configured to receive feedback from the output of the AC power source, the output of exciter, and the output of the generator to determine when a fault event has occurred in any of the AC power source, the exciter, or the generator and send one or more fault feedback signals to the rectifier controller.

8. The system of claim 1, wherein the AC power source includes a permanent magnet generator.

9. A system for controlling power generation, comprising:
a first stage configured to produce a first power output, having a first stage controller; and
a second stage configured to receive and alter the first power output and output a second power output different from the first power output, the second stage having a second stage controller,
wherein the first stage controller and the second stage controller are operatively connected for direct communication, wherein the direct communication from one controller to the other is configured to modulate one or more of the first power output or the second power output based on the communication between the first stage controller and the second stage controller, wherein the second stage controller is configured to control a rectifier to modulate rectification of the output of a generator based at least in part on a feedback fault signal from the first stage controller.

10. The system of claim 9, wherein the first stage controller is configured to determine when a fault event has occurred in the first stage and communicate a fault signal to the second stage controller, wherein the second stage controller is configured to modulate the second power output based on the fault signal from the first stage controller.

11. The system of claim 10, wherein the second stage controller is configured to control one or more second stage power generation elements operatively connected to the second stage controller based on the fault signal.

12. The system of claim 9, wherein the second stage controller is configured to determine when a fault event has occurred in one or more of the first stage and/or the second stage and communicate a fault signal to the first stage controller, wherein the first and/or second stage controller is configured to modulate one or more of the first power output and/or the second power output based on the fault signal from the second stage controller.

13. The system of claim 12, wherein the first stage controller and/or the second stage controller is configured to control one or more first and/or second stage power generation elements operatively connected to a respective first or second stage controller based on the fault signal.

14. The system of claim 9, wherein the first stage includes an alternating current generation stage.

15. The system of claim 9, wherein the second stage includes a direct current generation stage.

16. A method, comprising:
determining when a fault event has occurred in an AC power generation stage of a DC power generation system;
when a fault event has occurred in the AC power generation stage:
communicating a fault signal between an AC power generation stage controller and a rectification stage controller; and
actively controlling an output of a rectification stage of the DC power generation system based on the fault signal; and
determining when a fault event has occurred in the rectification stage of the DC power generation system;
when a fault event has occurred in the rectification stage:
communicating a fault signal between the rectification stage controller and the AC power generation stage controller; and
actively controlling an output of the AC power generation stage of the power generation system based on the fault signal.

17. The method of claim 16, further comprising:
generating an alternating current with an AC power source.

18. The method of claim 17, further comprising:
passively rectifying the alternating current with an exciter to produce a direct current; and
generating, from the direct current, a three phase alternating current with a generator.

19. The method of claim 18, further comprising:
actively rectifying the three phase alternating current to a direct current with a rectifier.

* * * * *